Dec. 28, 1965    R. M. WEYGANDT ETAL    3,225,894
MACHINE FOR HARVESTING BERRIES AND SIMILAR
PRODUCE FROM THEIR PLANTS
Filed Aug. 9, 1963    3 Sheets-Sheet 1

RAYMOND M. WEYGANDT
RAYMOND A. WEYGANDT
*INVENTORS*

BY *James L. Girman*
ATT'Y

Dec. 28, 1965         R. M. WEYGANDT ETAL         3,225,894
           MACHINE FOR HARVESTING BERRIES AND SIMILAR
                       PRODUCE FROM THEIR PLANTS
Filed Aug. 9, 1963                              3 Sheets-Sheet 2
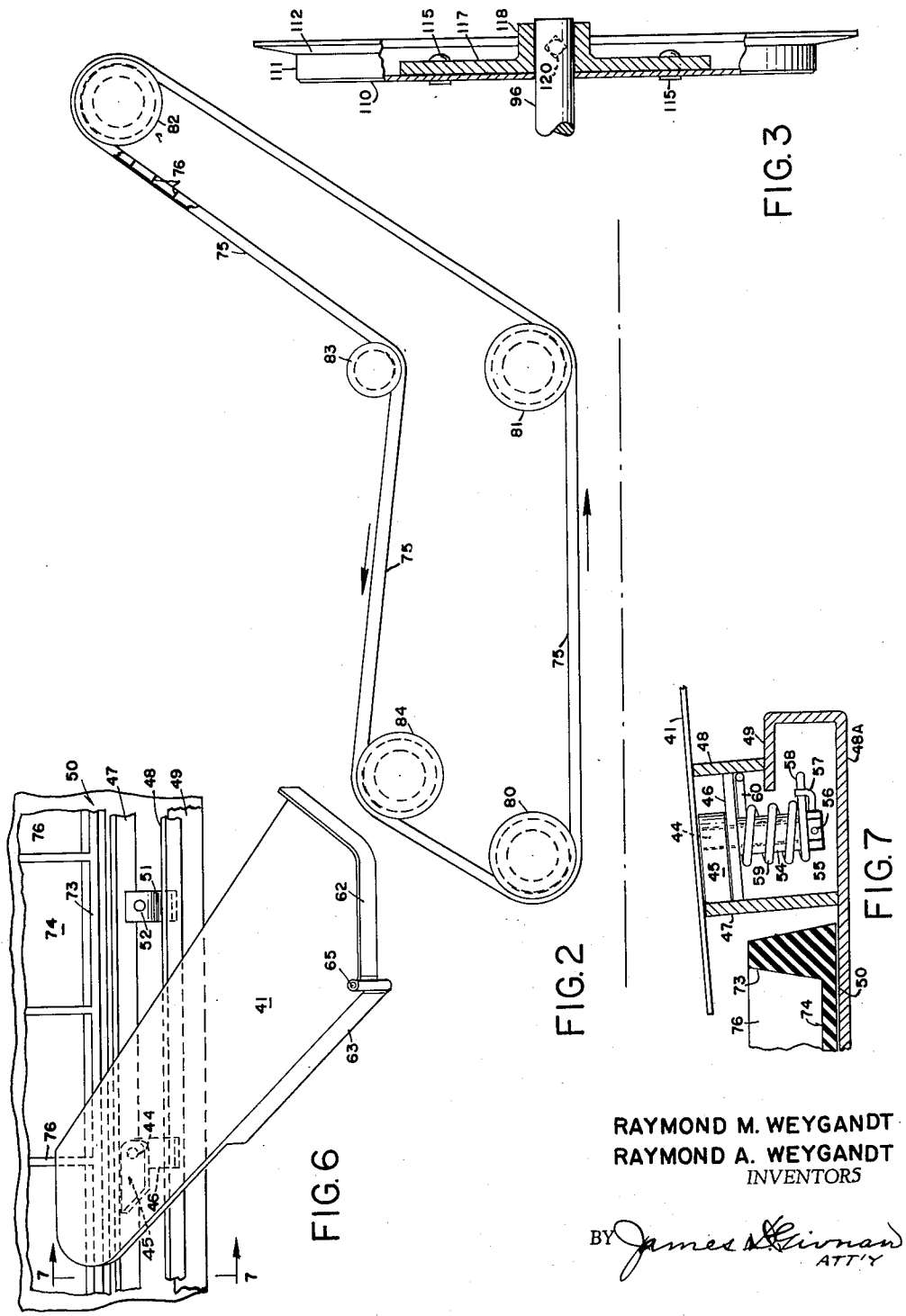
RAYMOND M. WEYGANDT
RAYMOND A. WEYGANDT
      INVENTORS
BY James L. Girnau
                ATT'Y

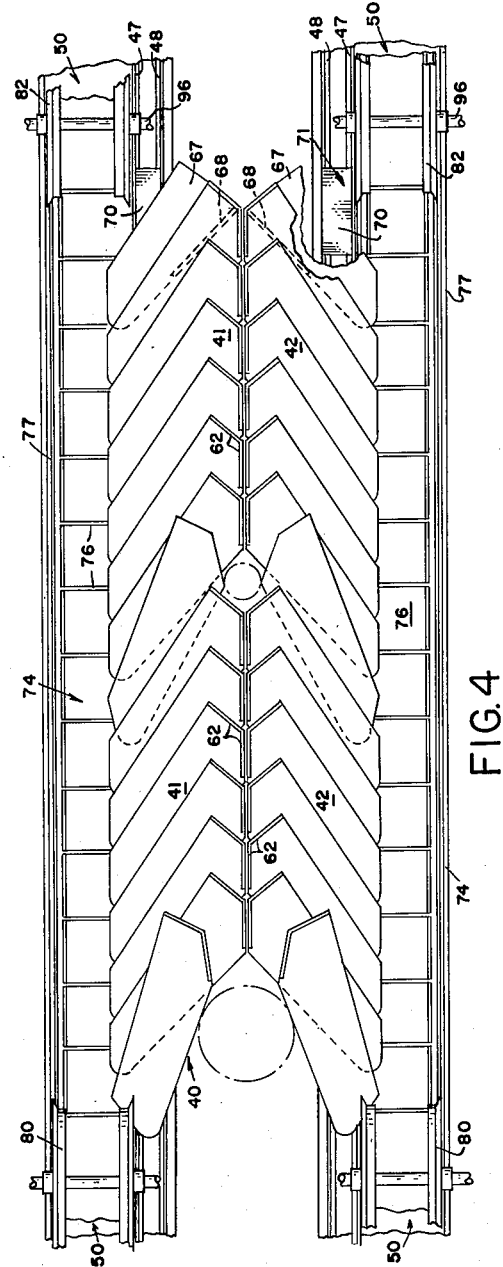
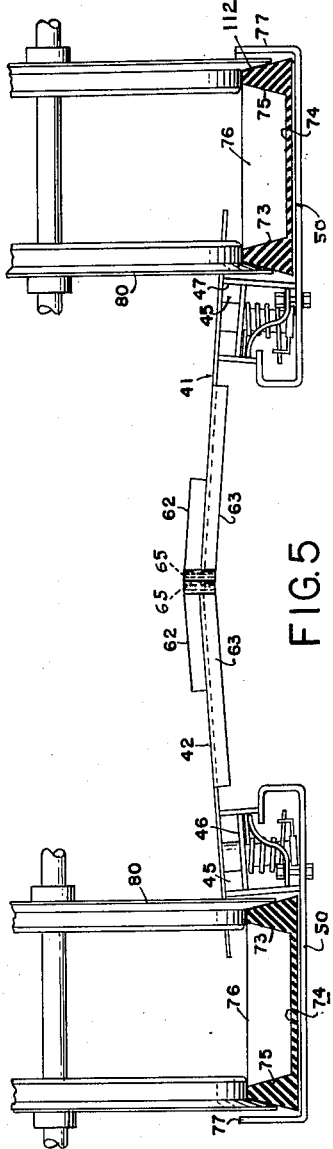

United States Patent Office 3,225,894
Patented Dec. 28, 1965

3,225,894
MACHINE FOR HARVESTING BERRIES AND SIMI-
LAR PRODUCE FROM THEIR PLANTS
Raymond M. Weygandt and Raymond A. Weygandt, both
of Rte. 1, Box 308, Canby, Oreg.
Filed Aug. 9, 1963, Ser. No. 301,032
3 Claims. (Cl. 198—140)

This application is a continuation in part of our co-pending application Serial No. 202,037, filed May 28, 1962, now Patent No. 3,126,692, wherein the harvesting machine is disclosed and claimed.

This invention relates to improvements in harvesting machinery and more particularly to conveyor means incorporated in a self-propelled machine for mechanically harvesting ripe berries from their bushes planted in rows.

It is one of the principal objects of the present invention to so construct and arrange endless conveyor means of the character described which in passing from the front to the rear of the machine the returning portion of such conveyor means shall be so disposed as to prevent the same from carrying berries toward the front of the machine and so that the bottom run of said conveyor means will be disposed below the path of movement of the berry harvesting means.

Another object is the provision of a flooring made of yieldingly and pivotally mounted overlapping shutters, adapted to open and close relative to the longitudinal center line of the harvester to accommodate the stocks of the bushes as the machine moves forwardly along the row and thus prevent injury to the bushes and eliminate loss of berries during the harvesting of the same.

A further object is the provision of new and novel driving and driven pulleys and conveyor belts entrained thereover in a new and novel manner and wherein each belt is integrated with continuous side flanges flexible in the direction of their length with buckets therebetween. The novel running relationship of the belts to the pulleys is such that harvested berries or any foreign matter separated therefrom will be at all times during conveyance confined within the bucket components and thus precluded from damaging entrapment between the pulley and belt flanges which would also result in belt and/or pulley slippage.

The bottom run of the belt is entrained under driven pulleys adjacent the sides of the flooring at both ends thereof then upwardly over elevated driving pulleys. The buckets along the bottom run of the belt open upwardly therealong beneath portions of the flooring to receive the harvested berries therefrom. As the buckets assume a downwardly open inverted position in passing over and downwardly from the driving pulleys the collected berries will spill from the buckets in a gentle and harmless manner.

In general, the harvester unit itself consists of an enclosure providing a restricted space within a longitudinal passageway to allow the entrance, travel through, and exit of the successive berry bushes as the machine travels along the crop row. The harvester unit establishes what is hereinafter sometimes referred to as a "berry-dislodging zone" and the conveying instrumentalities cooperating therewith establish a bilateral conveying zone, two rearwardly moving conveyor zones, and a discharge zone.

A still further object is the provision of conveyor means which is efficient in operation, economical to use, suited for one-man operation, and one which will save labor costs since it eliminates all necessity for manual contact with the berries.

The foregoing and other objects and advantages which will become subsequently apparent reside in the details of construction and operation as more fully hereinafter described and claimed, reference being had to the accompanying drawings forming a part hereof and in which:

FIGURE 2 is a side elevational view of a typical endless conveyor belt, a roller and typical driving and driven pulleys for the belt.

FIGURE 3 is an edgewise view of the typical driving or driven pulleys of FIGURE 2 on an enlarged scale and with fragments broken away to reveal internal parts.

FIGURE 4 is a top plan view of flooring made in accordance with the invention, with fragments broken away, and comprising a plurality of shutters operable automatically to permit passage of the stalks of plants through the flooring.

FIGURE 5 is an end elevational view of FIGURE 4 on an enlarged scale with fragments of the forward driven pulleys broken away.

FIGURE 6 is a top plan detail view of a typical shutter of the flooring arrangement shown in FIGURE 4, and FIGURE 7 is an enlarged sectional end elevational view taken approximately along the line 7—7 of FIGURE 6.

Figure 1:
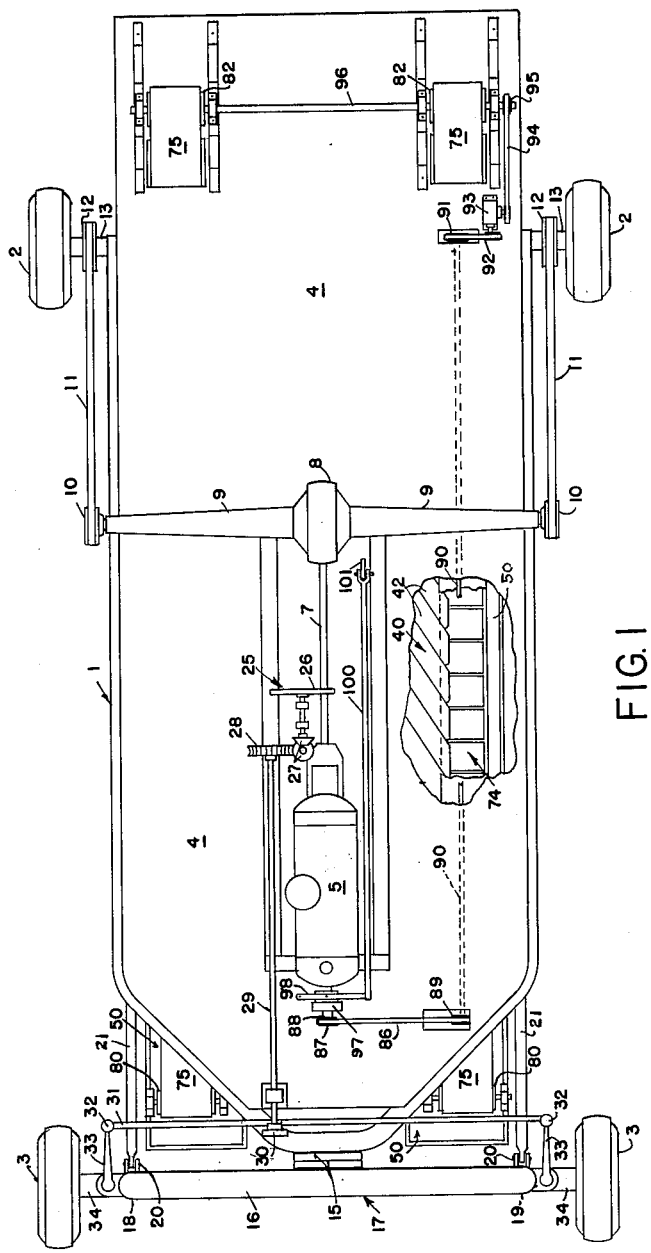
FIGURE 1 is a top plan view of a harvesting machine equipped with conveyor means made in accordance with the present invention and with a fragment of the machine broken away to illustrate underlying parts.

With continuing reference to the drawings wherein like reference characters designate like parts, reference numeral 1 indicates generally the main frame of a harvesting machine supported upon ground-engaging traction wheels 2 and steerable idling wheels 3.

A deck 4 is supported by the main frame of the machine and mounted thereon is an internal combustion engine 5 of any suitable type and horsepower connected in the conventional manner by a drive shaft 7 to a differential within a housing 8 and to two driving axles (not shown) within axle housings 9. The ends of the axles are provided with sprocket wheels 10 connected by sprocket chains 11 to driven sprockets 12 near the outer ends of axles 13 of the traction wheels 2.

The forward end of the main frame is rockably attached by wearplates 15 to a cross member 16 of an inverted U-shaped front frame member indicated generally at 17, and the leg members 18 and 19 of this front frame are connected as at 20 to the forward end of tie-rods 21 whose rearward ends are connected to rear leg members or corner posts (not shown) of the main frame 1.

By reason of the forward and rearward inverted U-shaped frame members of the machine and the deck 4 elevated relative thereto, a passageway extends entirely through the machine. The machine is steerable by suitable steering mechanism indicated generally at 25, comprising a steering wheel 26, bevel gears 27, worm and worm gears 28, steering column 29 connected by a link 30 to a tie rod 31 which is connected as at 32 and 33 to the steerable axles 34 of the front wheels 3.

The machine straddles a row of berry plants being dealt with and as the machine travels therealong the plants are received at the forward end of the flooring, indicated generally at 40, made of two series of plate-like shutter members indicated generally at 41 and 42 and normally disposed in generally herringbone fashion as shown. The shutters are adapted to open and close yieldingly and progressively about the stalks of the plants as the machine travels along the row and thus constitutes the bilateral conveying zone.

Each shutter member (see FIGS. 6 and 7) is pivotally mounted near its outer end by a pivot pin 44 welded to the under side of the shutter and extending downwardly through a detent or limit stop 45 also welded to the under side of the shutter. The pin 44 also extends downwardly through a bridge member 46 welded at both of its ends to parallel rails 47 and 48 whose bottom edges are securely held respectively against the bottom wall, 48A and to a lateral flange 49 of an elongated belt conveyor supporting tray or track 50 by a series of other bridge members 51 (see FIG. 6) welded at both their ends to the rail members 47 and 48 and secured to the bottom wall 48A of the tray by means of hold-down bolts 52. If desired, the bridge members 51 could be dispensed with by welding the bottom edges of the rail members 47 to the bottom wall of the tray 50 and the other rail members 48 to said lateral flange 49 thereof.

A sleeve 54 surrounds the pin 44 below the bridge member 46 and the lower end of the pin extends below the bottom of the sleeve and is threaded to accommodate a nut 55 adapted to be locked to the pin by a suitable set screw 56. The nut is provided with a radial arm 57 turned upwardly at its outer end to serve as a detent for one end 58 of a coil spring 59 encircling the sleeve 54 with its top end 60 bearing against the inside of the rail 48. Thus the springs become loaded when the shutters are swung outwardly to or toward an open position, as shown by the two pairs thereof in FIGURE 4, to insure their spring-urged return swing to a closed position.

The inner end of each shutter member in each series thereof, as best illustrated in FIGURES 4, 5, and 6, is flanged upwardly as at 62 and downwardly as at 63 for a portion of the length of its leading edge. The inner end of each flange 62 is welded to a pin 65 (see FIG. 6) to which the inner end of each flange 63 is also welded and the purpose of the pin is to reinforce the flanges against bending or twisting upon impact by the spring-urged closing of the shutters as they pass around the stalks of the plants or bushes being dealt with.

The last shutter-plate 67 at the rearward end of each series is flanged downwardly as at 68 for a portion of its leading edge. Underlying these last two shutter-plates are the horizontal flanges 70 of angle members 71 whose vertical flanges are secured by sheet metal screws or the like (not shown) to the sides of the rails 48. The free edges of the horizontal flanges 70 bear down upon the top of the rails 47 and the underlying space between the rails is thus closed off to prevent spillage or overflow of berries thereinto or the accumulation of debries or other foreign matter which would interfere with the proper function of the shutters 67.

As best shown in FIGURE 5 the shutter members in both series are tilted downwardly and outwardly from the center of the flooring so that their outer end portions overlie respectively the inner flanges 73 of two endless belts 74 having identical outer flanges 75 with spaced apart buckets 76 therebetween. Each of said belts, its side flanges 73 and 75 and bucket walls 76 can be advantageously and economically integrally moulded out of Neoprene, fabric-impregnated rubber or the like. The bottom reach of each belt 74 is supported within and runs along the tray or track 50 between the outer side flange 77 thereof and the rail 47. These tracks 50 are secured in any suitable manner to the bottom of the main frame 1 in parallel spaced relation to each other.

Both conveyor belts (see FIG. 2) are entrained under two driven pulleys 80 and 81, upwardly over and downwardly from driving pulleys 82 under idling rollers 83 and over a third pair of driven pulleys 84. This arrangement, along with the belt trays 50 constituting the two rearwardly moving conveyor zones, enables the bottom reach of the belt between the pulleys 80 and 81 to function on a plane with minimal ground clearance well below the bottom of the foliage of any plants being dealt with. Another feature of this novel belt arrangement is that when the belts travel around and downwardly from the driving pulleys 82 the resultant inversion of the buckets 76 will allow the collected berries to gravitate therefrom in a gentle and harmless manner, into any suitable subjacent receptacle (not shown).

The driving pulleys 82 may be operatively connected to the engine 5 (see FIG. 1) by any suitable means such as, for example, a belt 86 entrained over a pulley 87 on a power take off shaft 88, over a driven pulley 89 secured at one end of a shaft 90 whose opposite ends is provided with pulley 91 belt-coupled as at 92 to a speed reducer 93 connected by a driving belt 94 to a driven pulley 95 on one end of a shaft 96 to which both belt driving pulleys 82 are connected.

Any suitable clutching mechanism 97 (see FIG. 1) operable by a lever 98, a link 100, and a hand-lever 101 may be used for selectively operating the conveyor belts. The pulleys 80–82 and 84 are identical and each, as illustrated in FIGURE 3, is made of sheet metal spun from a flat piece thereof to provide a circular disc portion 110, a circumferential right angular rim 111, and an outwardly tapering circumferential flange 112, the taper of which flange matches (see FIG. 5) that of the outside of the flanges 73 and 75 of the conveyor belts. This is an important feature because it prevents entrapment and meshing of berries between the pulley rims and flanges and the flanges of conveyor belts which could cause slippage of the pulleys relative to the belts or vice versa.

The disc 110 of each pulley member is secured concentrically by rivets 115 or the like to a supporting disc 117 cast integrally with a hub portion 118 by means of which the pulley is secured to and rotatable with a common shaft 96 by means of a set screw 120.

From the foregoing it will be readily apparent that ripe berries dislodged from their bushes and falling downwardly upon the outwardly and downwardly sloping shutters 41–42 will gravitate therefrom while also being thrown laterally onto the conveyor belts by the outward swing imparted to the shutters by their passage around the stalks of the bushes being dealt with. The shutter-like flooring functioning as the bilateral conveying zone performs the important step of conveying dislodged berries over the belt flanges and into the belt buckets in a gentle and harmless manner. From the rearwardly moving belt conveyor zones, the collected berries are conveyed upwardly into the discharge zone established by inversion of the belts and belt buckets as they travel over the driving pulleys 82. The berries then spill from the downwardly opening buckets (FIG. 2) into suitable containers (not shown).

Although we have described the operation of the conveyor system of this invention in connection with the harvesting of berries, it is to be understood that such operation does not prescribe any limits of utility of the invention since obviously it could be used just as effectively and efficiently in the harvesting of other fruits and certain vegetables grown on row plants.

While we have shown a particular form of embodimnet of our invention, we are aware that many minor changes therein will readily suggest themselves to others skilled in the art without departing from the spirit and scope of the invention. Having thus described our invention what we claim as new and desire to protect by Letters Patent is:

1. In a harvesting machine, a conveyor for conveying harvested material from a first zone to a second zone,
   said conveyor comprising an endless belt having an uninterrupted integral flange at each side margin thereof and integrated buckets therebetween,
   a sheave unit engaging the flanged sides of said belt and having circular portions engaging the rim portions of said flanges,
   said unit having only one flange for each belt flange,
   each unit flange engaging the outer face only of its respective belt flange whereby the inner faces of the belt flanges are free from contact by said sheave unit.

2. In a harvesting machine,
   a conveyor for conveying harvested material from a first zone to a second zone,
   said conveyor comprising an endless belt having a flange at each side margin thereof, a sheave unit engaging the flanged sides of said belt and having circular portions engaging the apex portions of the belt flanges,
said unit having only one flange for each belt flange,
each unit flange engaging the outer face only of its respective belt flange whereby the inner faces of the belt flanges are free from contact by said sheave unit,
transversely disposed bucket forming elements interconnecting the inner faces of said belt flanges to effect stiffening of said belt flanges against inward collapse because of pressure against the apexes and outer faces of said belt flanges.

3. In a harvesting machine,
a conveyor for conveying harvested material from a first zone to a second zone,
said conveyor comprising an endless belt having a tapering flange at each side margin thereof,
a sheave unit engaging the flanged side of said conveyor and having circular portions engaging the apex portions of said tapering belt flanges,
said unit having only one flange for each belt flange,
each unit flange engaging the outer face only of its respective belt flange whereby the inner faces of the belt flanges are free from contact by said sheave unit,
transversely disposed bucket forming elements interconnecting the inner faces of said belt flanges to effect stiffening of said belt flanges against inward collapse because of pressure against the apexes and outer faces of said belt flanges.

References Cited by the Examiner

UNITED STATES PATENTS

| | | | |
|---|---|---|---|
| 515,031 | 2/1894 | Turner | 56—29 |
| 928,406 | 7/1909 | Strain | 20—78.6 |
| 947,742 | 1/1910 | Rohrbach | 171—119 X |
| 1,475,765 | 11/1923 | Gage | 20—78.6 |
| 2,264,332 | 12/1941 | Peterson. | |
| 2,670,837 | 3/1954 | Hansen | 198—201 |
| 2,711,816 | 6/1955 | Reno | 198—201 |
| 3,070,210 | 12/1962 | Woodward | 198—33 |

FOREIGN PATENTS

| | | |
|---|---|---|
| 781,064 | 5/1935 | France. |
| 115,553 | 12/1945 | Sweden. |

ABRAHAM G. STONE *Primary Examiner.*
RUSSELL R. KINSEY, ANTONIO F. GUIDA,
*Examiners.*